United States Patent [19]

Ragot

[11] Patent Number: 4,656,949
[45] Date of Patent: Apr. 14, 1987

[54] DEVICE FOR GRIPPING AND TRANSFERRING LOAD SUPPORTS OR CONTAINERS USING SYNCHRONOUS ENDLESS CHAINS WITH DRIVE FINGERS, MOUNTED TO TRANSVERSELY ADJUSTABLE MODULES

[75] Inventor: Jean C. R. Ragot, L'ile Adam, France

[73] Assignee: Lapouyade S.A., Paris, France

[21] Appl. No.: 778,150

[22] Filed: Sep. 20, 1985

[30] Foreign Application Priority Data

Sep. 4, 1985 [FR] France ................................ 85 13116

[51] Int. Cl.⁴ ...................... B65G 19/02; B65G 21/12; B65G 25/00
[52] U.S. Cl. ................................ 104/172.3; 104/172.1; 198/343; 198/465.1; 198/726
[58] Field of Search .......... 104/172 B, 172 BT, 172 R, 104/165, 168, 163; 198/627, 465.1, 726, 343

[56] References Cited

U.S. PATENT DOCUMENTS

| | | | |
|---|---|---|---|
| 2,382,087 | 8/1945 | Miller | 198/343 |
| 3,160,267 | 12/1964 | Howell, Jr. | 198/343 X |
| 4,116,324 | 9/1978 | Burmeister | 198/465.1 |
| 4,240,540 | 12/1980 | Hobbs et al. | 198/726 X |
| 4,392,911 | 7/1983 | Ulrich et al. | 198/726 X |
| 4,520,613 | 6/1985 | Claudio | 198/627 X |
| 4,543,150 | 9/1985 | Marchetti | 198/627 X |
| 4,601,388 | 7/1986 | Blümle | 198/726 |

FOREIGN PATENT DOCUMENTS 2546860 12/1984 France.
58-125508 7/1983 Japan.
2092978 8/1982 United Kingdom.

Primary Examiner—Robert B. Reeves
Assistant Examiner—Scott H. Werny
Attorney, Agent, or Firm—Christel, Bean & Linihan

[57] ABSTRACT

Two independent modules, disposed on a mobile handling platform, each comprise an endless chain with a pulling finger and a pushing finger. The operations of the chains are symmetrical with respect to the load drive axis. In operation, the pulling fingers engage a handle on the front of a load container and drive it until the pulling fingers reach a portion where their movement is lateral to the drive axis, temporarily stopping the container movement until the pushing fingers engage a handle on the back of the load container, serving to clamp the container during movement of the platform. Releasing the container can take place on the same side as that of loading by reverse rotation of the chains or from the opposite side by continuing the movement of the chains in the same direction, in accordance with an equivalent procedure. The modules are movable transversely with respect to each other under the control of a single motor driven reducer so that the spacing therebetween may be adjusted between a side by side position provided for gripping loads of minimum width and a spaced apart position for gripping loads of greater width.

8 Claims, 3 Drawing Figures

DEVICE FOR GRIPPING AND TRANSFERRING LOAD SUPPORTS OR CONTAINERS USING SYNCHRONOUS ENDLESS CHAINS WITH DRIVE FINGERS, MOUNTED TO TRANSVERSELY ADJUSTABLE MODULES

BACKGROUND OF THE INVENTION

1. Field of the Invention

The invention relates to a device for gripping load supports or containers such as palettes, trays or containers of variable dimensions.

2. Description of the Prior Art

In the field of automated storage devices it is well known to use a mobile platform moving in a central alley which allows containers placed in racks on each side of this alley to be automatically removed or stored. This platform comprises for this purpose a device which allows a container to be removed from its storage position, transferred to a work table or replaced in another storage position. The device in question is therefore integral with the platform whose movement it follows. Thus, a device is known which comprises an endless chain with horizontal movement, having a take-up finger and being engaged over four, pinions disposed at the, four apices of a rectangle. The take-up finger engages the container by means of a handle provided for this purpose in its movement parallel to this handle and driving the container in a movement perpendicular to the first one. The container is guided in its movement by two lateral rails which allow it to slide above the chain. Such a device does not allow a container to be moved from one side of the platform to the other. In addition, during the movement of the platform itself along the racks, the container, which must then be immobilized in its drive direction on this platform, is only held by a single finger, and is therefore not immobilized in a very reliable way. Other devices allow the container to be moved from one side to the other of the platform, more especially by the use of two fingers, but the container is again driven by cooperation of a single finger at a time.

This system has been improved by using a flexible element having two fingers which engage successively in the two front and rear handles of the container or receptacle. During storage thereof, the two fingers are disengaged successively from the front and rear handles allowing storage on one side or the other of the platform. For this, a flexible endless element actuated horizontally by several pinions mounted on the platform and driven by a motor is provided with two fingers, one acting by pulling and the other by pushing the receptacle. These fingers occupy an identical position transversely to the longitudinal axis of the flexible element. The advance of the flexible element is such that, in a given position of this advance and after engagement of the pulling finger inside one of the housings, and consecutive driving of the receptacle from a first storage position, this pulling finger momentarily stops driving the receptacle, so as to allow engagement of the pushing finger inside the other housing of the receptacle. The receptacle may then be driven by means of the two fingers. In another given position of the advance of the flexible element, the pushing finger momentarily stops driving the receptacle so as to allow the pulling finger to be disengaged from its housing. Then only the pushing finger alone drives the receptacle to another storage position where it is in its turn disengaged from its housing.

This gripping device finds a particularly interesting application in installations for handling containers or receptacles of standard dimensions, for example when it is a question of storing or handling small parts or documents distributed in a large number of containers of uniform size, this is the case for storing spare parts or else in the field of automatic document search.

There exist however some cases where such storage translators are caused to transfer loads of substantially different nature and dimensions. It happens in fact that in warehouses or stores there is sometimes need to store, in the storage racks on each side of the central alley, not only containers serving as receptacles, but also trays or palettes, carrying packets or loads which may be taken up moreover by other transfer means such as fork-lift trucks.

The known device mentioned, hereinabove which is designed for a well defined type of receptacle; does not allow these loads of varying shapes and dimensions to be gripped.

SUMMARY OF THE INVENTION

The invention brings a solution to this problem in that it provides an improvement to this endless chain and drive finger gripping device which makes it instantly adaptable to the transfer of containers, palettes, machining trays and, generally, to load supportsor containers of different dimensions.

According to the invention, on the mobile handling platform are disposed two independent modules each comprising a flexible element with two drive fingers, the two flexible elements having symmetrical operation with respect to the load drive axis, and the two modules being movable transversely with respect to each other which allows the gripping system to engage loads of different widths between a load of minimum width corresponding to the position of the two modules disposed side by side and a load of maximum width corresponding to the two modules in the maximum spaced apart position.

According to a particular characteristic of the invention, the transverse movement of at least one module with respect to the other is provided by a single drive member which ensures the relative movement of the module along a transverse sliding and guide member, said transverse movement being not incompatible with a system for transmitting the movement of the drive pinion driving the flexible element of one module to a pinion driving the flexible element of the other module.

BRIEF DESCRIPTION OF THE DRAWINGS

The features and advantages of the invention will be clear from reading the following description of embodiments given by way of non-limiting examples and with reference to the accompanying drawings which show.

DESCRIPTION OF THE PREFERRED EMBODIMENTS

Figure 1:
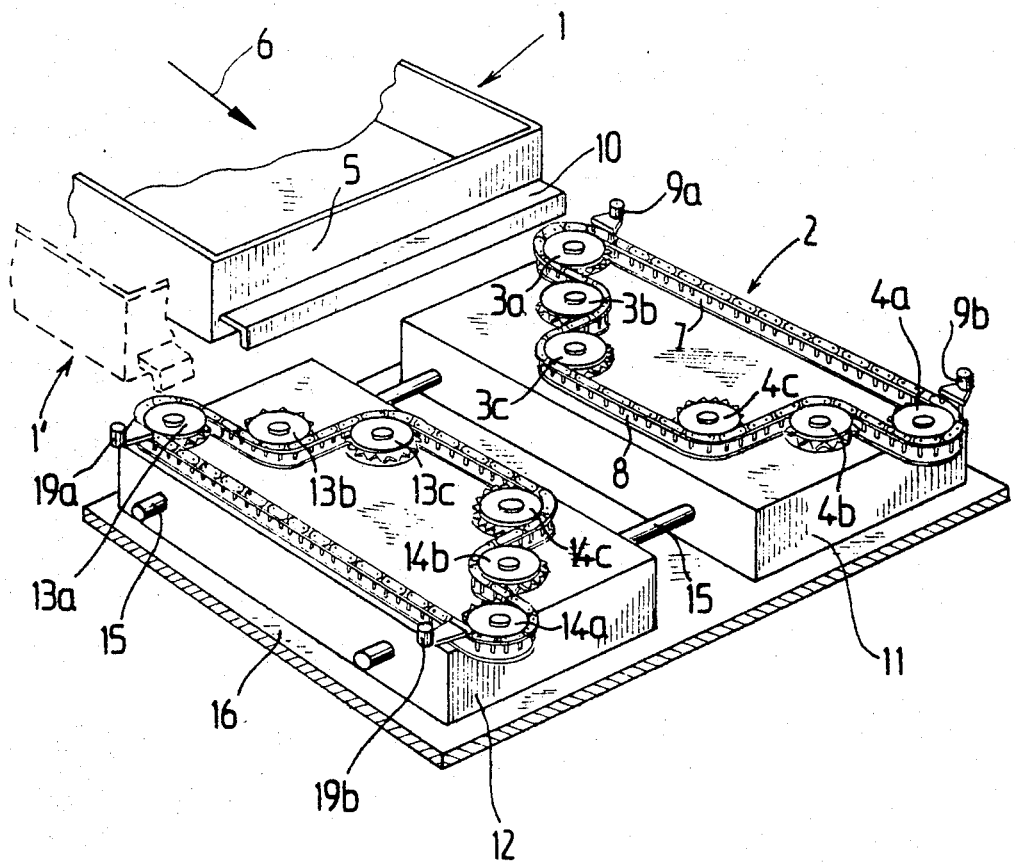
FIG. 1: a perspective view of a device according to the invention adapted for handling a storage container.

FIG. 1 shows a device in accordance with the invention adapted for transferring a load support and more especially ready to drive a container or receptacle 1 which is facing it or a container 1' of larger size of which only the end has been shown with a broken line. The drive device is formed from two independent modules 11 and 12 resting on a handling platform 16. These modules form as it were trays intended to receive the drive mechanism which will be described further on. In the present case module 11 is fixed but module 12 may move on the platform between a position in which it is disposed side by side with the first module and an opposite position in which it is spaced apart therefrom to the maximum allowed by the free movement of guide members 15. In the case in point, these latter are simple rods anchored in module 11 and over which module 12 slides. In the position shown in FIG. 1 in which the two modules are spaced apart, the drive device will be able to grip the larger sized container 1'. It will be readily understood that, conversely, if module 12 is disposed side by side with module 11, the drive device will only be able to act on container 1 whose dimension corresponds to the total width of the two modules.

Each of these modules 11 and 12 is equipped with a drive mechanism properly speaking, the operation of which is identical and symmetrical with respect to the load drive axis illustrated by arrow 6. Thus, the mechanism for driving module 11 comprises an endless chain 2 with horizontal movement, which cooperates with two groups of three pinions (3a 3b, 3c) and (4a, 4b, 4c), the three pinions of each group, taken two by two, being aligned along an axis which is neither parallel to the front face 5 of container 1 nor parallel to its drive direction shown by arrow 6. The axes for aligning the pinions, these latter being taken two by two, converge towards the central zone of the platform not shown, Chain 2 cooperates with the pinions the furthest apart 3a and 4a by its contact face with the pinions, called "inside" face 7, with the intermediate pinions 3b, 4b by its "outer" face 8 and finally with the pinions the closest together 3c, 4c, again by its inner face 7. This chain comprises two fingers 9a, 9b, fixed thereto in cantilever fashion on the outer face 8 side and above chain 2, and are directed vertically in a direction opposite the support platform. The two fingers 9a, 9b are spaced apart by a length substantially equal to the length of a container. This arrangement. in which a finger is situated near each container 1 placed on the left or on the right of the platform, allows one of these containers to be gripped with a minimum of movement of the take-up finger. The six pinions and thus chain 2 are driven in rotation in the plane of chain 2, for example by means of a motor not shown placed thereabove in the module. Each container (1, 1') is provided with a handle 10 whose section is in the form of an L, and which extends over the front face 5 of container 1.

The rear face of container 1, not shown in the drawings, is also equipped with a similar handle 10 which defines therewith a housing having a downwardly orientated U shaped section. The inner width of handle 10 is greater than the outer diameter of each finger 9a, 9b so that these latter may be housed therein. Two rails not shown and directed in the direction of arrow 6 guide container 1 laterally when it is driven by fingers 9a, 9b and allows it to slide above chain 2. Fingers 9a, 9b project sufficiently above the chain so as to be able to engage with handle 10 when they pass round pinion 3a.

Module 12, as mentioned above, is equipped with a symmetrical chain drive mechanism on which we find the same set of pinions (13a, 13b, 13c) and (14a, 14b, 14c) and two drive fingers 19a, 19b. The movement of the chains equipping each module is perfectly synchronized so that the drive fingers 9a and 19a on the one hand and 9b and 19b on the other are always facing each other with respect to the axis of movement of the container and simultaneously drive handle 10 by each of its ends. This synchronization is provided for example by mechanical transmission of the movement of a drive pinion of the first module to a similar pinion of the other module which will drive the chain. This mechanical transmission system not shown, is obviously provided whatever the relative position of the two modules.

Figure 2:
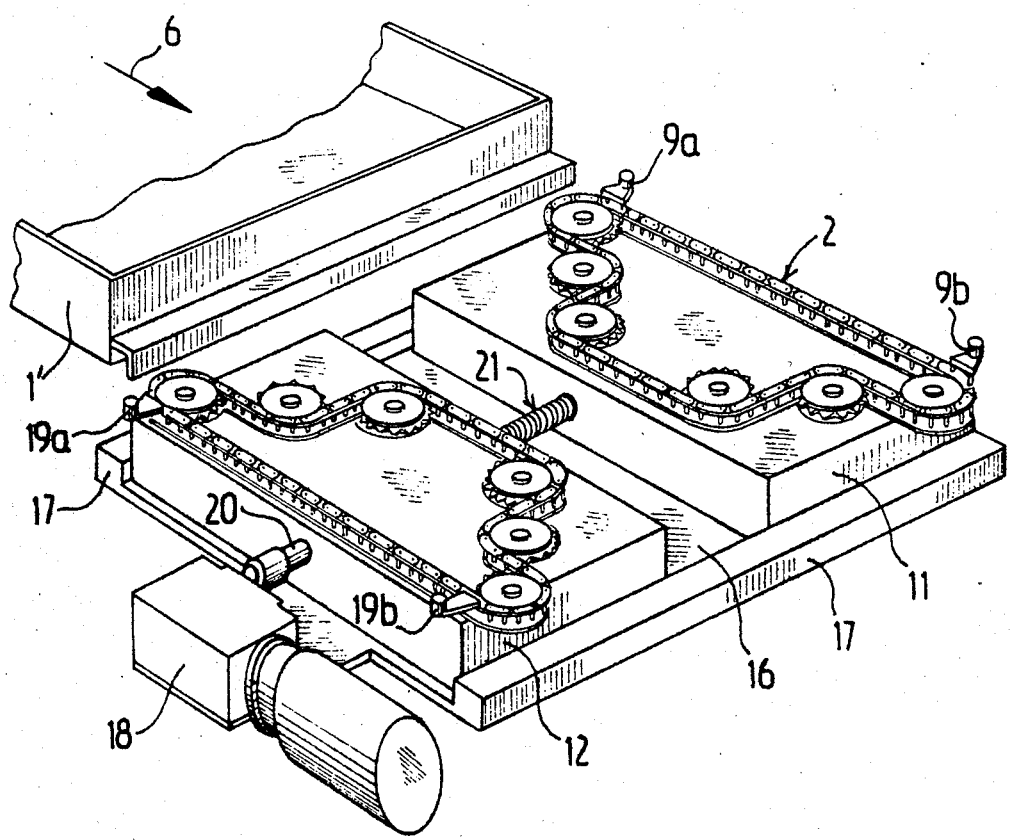
FIG. 2: a perspective view of another embodiment of a device according to the invention.

The variant shown in FIG. 2 shows the two modules 11 and 12 and their chain drive mechanism such as described with reference to FIG. 1. The modules are shown in the spaced apart position corresponding to a maximum width of container 1' and rest on the handling platform 16 provided with two guide flanges 17. A single motor driven reducer 18, mounted on this platform, controls the rotation of a shaft 20 passing through module 12 and penetrating into module 11. This shaft comprises, on at least a part of its length, a screw thread 21 which cooperates with two reversed pitch tappings respectively on each of the modules so that the rotation of shaft 20 causes the two modules to move away from each other or close to each other.

In another variant not shown it is shaft 20 which may be provided with a reversed pitch screw thread 21 whereas the tappings provided in each of the modules have identical pitches.

The two modules move then simultaneously between the position shown and a position in which they are disposed side by side. In this latter case they are well centered on tray 16 which contributes to balancing the load carried by the handling platform. With such an arrangement, the user may at will adjust the spacing of modules 11 and 12 depending on the size of the load to be moved or on the width of the handle with which it is provided.

Figure 3:
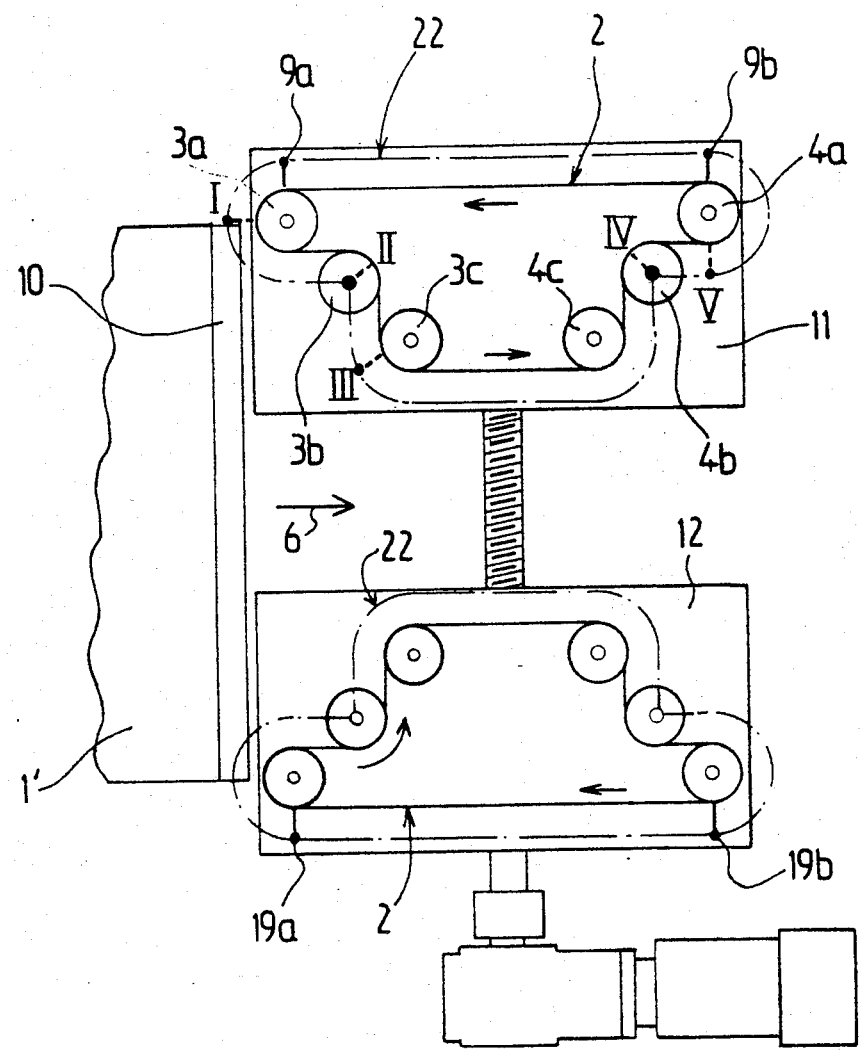
FIG. 3: a schematic plan view of the device shown in FIG. 2.

FIG. 3 shows schematically the device in a variant of the invention shown in FIG. 2, during operation thereof. The chains 2 of each module 11 and 12 are actuated in the direction of the arrow symmetrically with respect to the axis 6 of movement of container 1'. From the position shown, the drive fingers 9a and 9b on module 11, and 19a and 19b on module 12, will travel over the path shown by the dash dot line 22, and will occupy on this path successive positions(I, II, III . . . ) shown with broken lines corresponding to successive phases of gripping the container 1'. Since the movement of the two chains on the two modules is synchronized, the operation thereof will be described with reference to the movement of fingers 9a and 9b of the chain carried by module 11, it of course being understood that that of fingers 19a and 19b of the other chain are quite identical.

On start up of chain 2, finger 9leaves the starting position, effects a rotation at I about pinion 3a and thus penetrates into the front handle 10 of the container. After passing round pinion 3a, finger 9a drives the container in the direction of arrow 6 and is then immobilized at II while its support passes round pinion 3b. The container is temporarily stopped until finger 9a passes round pinion 3c (position III). It will again be moved towards the center of the platform until finger 9a has passed beyond pinion 4c before being immobilized in position IV when its support passes round pinion 4b. Simultaneously, finger 9b will have reached position I at the level of pinion 3a and will engage in the rear handle of the container. To the following movement of finger 9a as far as position V at the level of pinion 4a there corresponds a movement of finger 9b as far as pinion 3b, which causes a last movement of the container into a centered position on the platform under the effect of the pull of finger 9a combined with the push of finger 9b.

The two modules 11 and 12 shown in the spaced apart position have thus transferred a container 1' of maximum size onto the handling platform. The load is held in position there in front by means of fingers 9a and 19a and at the rear by means of fingers 9b and 19b. It is thus perfectly clamped and cannot move during movement of the platform. The operation for releasing the container will take place on the same side as that of loading by reverse rotation of the chains, or from the opposite side by continuing the movement of the chains in the same direction, in accordance with an equivalent procedure.

What is claimed is:

1. In a device for gripping load supports or load containers of different dimension each having a front and rear and a load drive axis substantially perpendicular to said front and rear for transferring same by means of a mobile handling platform providing an allowed clearance comprising at least one flexible endless element actuated horizontally by several pinions and driven by a motor, said flexible element being provided with at least two fingers intended to cooperate with housings provided on front and/or rear of the load support or container, one of the fingers acting by pulling and the other by pushing, said flexible element having an advancing movement such that the pulling finger, after being engaged in the front housing of the load support and moving this latter to a first positon on the platform, has a portion of movement generally lateral to the load drive axis, such that said pulling finger stops driving the load support for a time sufficient to allow the pushing finger to be engaged inside a rear housing, and so that driving of the load support continues until the load support is centered on the platform, through the simultaneous action of the pulling finger and of the pushing finger, there are disposed on the mobile handling platform two independent modules one at least of which is movable transversely with respect to the other, the two modules being able to occupy all positions between a position in which they are disposed side by side for gripping a load support of minimum width and a position in which they are spaced apart to the maximum of the clearance allowed by the platform for gripping a load support of maximum width, each module comprising a flexible endless element having at least two drive fingers, there being two flexible elements, each one mounted on a corresponding one of said two modules symmetrically with respect to the load drive axis and having an operation synchronized from a symmetrical position of their drive fingers.

2. The gripping device as claimed in claim 1, wherein one of the two modules is fixed and the other is mobile, sliding over guide members.

3. The gripping device as claimed in claim 2, wherein said guide members are rods anchored in one of the modules and on which the other module slides.

4. The gripping device as claimed in claim 1, wherein said two modules are mobile and are moved in translation over the platform by a single motor driven reducer.

5. The gripping device as claimed in claim 4, wherein said motor driven reducer rotates a shaft having a screw thread which cooperates with two reversed pitch tappings provided respectively on each of said modules.

6. The gripping device as claimed in claim 4, wherein said motor driven reducer rotates a shaft having a reversed pitch screw thread which cooperates with two identical pitch tappings provided respectively in each of said modules.

7. The gripping device as claimed in claim 1, wherein said modules slide between two guide flanges provided on the side of said platform.

8. The gripping device as claimed in claim 1, wherein said pinions are arranged in two groups, the pinions of each module of each group being aligned along an axis disposed at an angle to the load drive axis.

* * * * *